Patented Mar. 31, 1931

1,798,766

UNITED STATES PATENT OFFICE

FRITZ STOEWENER, OF LUDWIGSHAFEN-ON-THE-RHINE, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY

MANUFACTURE OF ACTIVE ADSORBENTS

No Drawing. Application filed March 4, 1926, Serial No. 92,363, and in Germany March 30, 1925.

Active adsorbents, such as active oxids, hydrated oxids, salts and the like, as for example active silica, alumina, or mixtures of such compounds are usually obtained by converting the initial materials, whether in a solid, dissolved, liquid or gaseous state, by means of acids, alkalies or other substances into jellies, in some cases with a sol being formed as an intermediary product, purifying the jelly by washing, and subsequently drying it. A great drawback of this method is that washing requires much time. The bulk of the water-soluble impurities which are for the most part salts formed in the preparation of the jelly, is rapidly washed out, but it is very tedious to remove the last amounts of them, the more so as some such jellies by prolonged washing become peptisized and slimy, so that their penetration by the washing water is retarded. If, on the other hand, the jelly is dried prior to any washing with a view to facilitate this operation and the dried mass subjected, either directly or after treatment with steam, to washing, this operation can then easily be effected. However, the gel crumbles mostly during the drying process on account of the separation of salts and the like, and a fine-granular or even sand-like product of poor hardness and adsorption power is obtained.

I have now found that the tedious washing operation can be shortened considerably and nevertheless a coarse-grained active mass of high adsorbing power can be obtained by removing the impurities only partially from the jelly, then drying the latter completely or partially, removing the last part of the impurities by washing the shrunken mass, and subsequently drying the purified mass. As I have found the partially purified and partially or completely dried mass is best saturated with water vapor prior to the final purification, preferably while still hot, by which treatment the size of the grains is better preserved. The final purification may be effected by washing or boiling the mass with water, or first with acids, when the mass is difficultly soluble therein which treatment is also carried out at elevated temperature, with advantage.

I have also found that the adsorbing power of the masses is best when carrying out both drying steps at temperatures above 120° C.

The manner of carrying out my invention in practice will be further illustrated by the following examples to which, however, the invention is not limited.

Example 1

550 litres of a sodium silicate solution of 1.164 specific gravity are caused to run, in the course of an hour, into a mixture of 51 kilograms of concentrated sulfuric acid, 46 kilograms of ice and 60 litres of water while stirring well; the reaction should take place between 15 and 35° C., or better at lower temperatures. Immediately thereafter the sol is heated as rapidly and to as high a temperature as possible, while stirring. At between 60 and 90° C. the sol sets to a stiff jelly which is broken into pieces, preferably after standing for some hours. It is washed for 10 or 20 hours, whereby the bulk of salts and acid is removed. The gel is then dried at between 100 and 250° C., preferably at 160° C., in a current of air or other gas, saturated with water vapor, then again thoroughly washed or decanted with hot water and dried again at between 200 and 400° C. A coarse-grained active silica of high adsorbing power is obtained.

Example 2

1 to 3 parts, by volume, of a 20 per cent hydrochloric acid are slowly added at room temperature or at a lower temperature to 17 parts, by volume, of an 8 per cent sodium tungstate solution, while stirring well. A transparent non-alkaline sol is obtained which after some time sets to a jelly. After standing for a length of time the jelly is broken into pieces, washed for about 6 hours and further treated in the manner described in Example 1.

Example 3

An acid silica sol obtainable according to Example 1 is allowed to set to a jelly which is comminuted into cubes of about 2 centimetres in length. The said cubes are washed for about 4 hours with hot water, preferably distilled water, whereby about 75 per cent of the salts and acid present are removed. The pieces of jelly thus washed are then quickly dried to a water content between about 20 and 40 per cent by means of a current of air which has a temperature between 160° and 200° C., whereby the jelly shrinks to a small part of its original volume. The silica gel thus obtained is then saturated with water vapour to which air is mixed, in order to avoid decrepitation of the gel when coming into contact with the liquid, whereupon the mass is washed for a short time with dilute hydrochloric acid and then for a longer time with pure water, the pure gel then being dried in a current of air first at above 120° C. and finally at 400° C.

100 grams of the gel thus prepared having a grain-size between 2 and 4 millimetres adsorb at 18° C. from a gas current saturated to about 10 per cent with benzene vapour, 16.6 grams of benzene.

What I claim is:

1. The process of manufacturing active adsorbents from mineral compounds in jelly form which comprises removing part of the water-soluble impurities from the jelly by washing, removing water, then washing again and drying.

2. The process of manufacturing active adsorbents from mineral compounds in jelly form which comprises removing part of the water-soluble impurities from the jelly by washing, drying it partially, washing again, and drying completely.

3. The process of manufacturing active adsorbents from mineral compounds in jelly form which comprises removing the bulk of water-soluble impurities from the jelly by washing, removing water, saturating the product with water vapor, washing again and drying it.

4. The process of manufacturing active adsorbents from mineral compounds in jelly form which comprises removing part of the water-soluble impurities from the jelly by washing with water, drying, washing with an acid and finally with water again and drying the product.

5. The process of manufacturing active adsorbents from mineral compounds in jelly form which comprises removing part of the water-soluble impurities from the jelly by washing, drying at above 120° C., washing completely and drying at more than 120° C.

In testimony whereof I have hereunto set my hand.

FRITZ STOEWENER.